US012682831B2

(12) United States Patent
Gao

(10) Patent No.: US 12,682,831 B2
(45) Date of Patent: Jul. 14, 2026

(54) METHOD FOR DRIVING DISPLAY PANEL, DISPLAY PANEL, AND DISPLAY APPARATUS

(71) Applicants: Wuhan Tianma Microelectronics Co., Ltd., Wuhan (CN); Wuhan Tianma Microelectronics Co., Ltd. Shanghai Branch, Shanghai (CN)

(72) Inventor: Hanfei Gao, Wuhan (CN)

(73) Assignees: Wuhan Tianma Microelectronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/784,871

(22) Filed: Jul. 25, 2024

(65) Prior Publication Data

US 2024/0379052 A1 Nov. 14, 2024

(30) Foreign Application Priority Data

Feb. 28, 2024 (CN) ......................... 202410224757.2

(51) Int. Cl.
*G09G 3/32* (2016.01)

(52) U.S. Cl.
CPC ........... *G09G 3/32* (2013.01); *G09G 2310/08* (2013.01); *G09G 2320/0233* (2013.01); *G09G 2320/0247* (2013.01); *G09G 2330/021* (2013.01)

(58) Field of Classification Search
None
See application file for complete search history.

(56) References Cited

U.S. PATENT DOCUMENTS

2001/0024187 A1* 9/2001 Sato ..................... G09G 3/3659 345/98
2008/0106542 A1* 5/2008 Park ....................... G09G 5/008 345/212
2013/0038639 A1* 2/2013 Han ......................... G09G 3/20 345/204

(Continued)

FOREIGN PATENT DOCUMENTS

CN 111383588 A 7/2020
CN 115331630 A 11/2022

(Continued)

OTHER PUBLICATIONS

Chinese Office Action mailed Sep. 3, 2025, issued in related Chinese Application No. 202410224757.2, 18 pages.

*Primary Examiner* — Dorothy Harris
(74) *Attorney, Agent, or Firm* — Wiersch Law Group

(57) ABSTRACT

A method for driving a display panel, the display panel and a display apparatus are provided. During the low-frequency driving, the impact of streaking issues on display can be effectively weakened during screen switching. The method for driving the display panel includes: in a first mode, a driving process of the display panel includes a first stage, a second stage and a third stage, wherein in the first stage, a first screen is displayed at a first frequency; in at least a part of the second stage sequential to the first stage, the first screen is displayed at a frequency greater than the first frequency; and in the third stage, a second screen is displayed at the first frequency.

14 Claims, 7 Drawing Sheets

(56) References Cited

U.S. PATENT DOCUMENTS

| | | | | | |
|---|---|---|---|---|---|
| 2014/0375627 | A1* | 12/2014 | Kim | G09G 3/3677 | 345/90 |
| 2016/0035260 | A1* | 2/2016 | Kim | G09G 3/3614 | 345/212 |
| 2016/0189682 | A1* | 6/2016 | Liu | G09G 5/14 | 345/589 |
| 2020/0111418 | A1* | 4/2020 | Nam | G09G 3/3233 | |
| 2020/0211471 | A1* | 7/2020 | Park | G09G 3/3233 | |
| 2020/0226980 | A1* | 7/2020 | Park | G09G 3/3233 | |
| 2021/0043143 | A1* | 2/2021 | Kim | G09G 3/3258 | |
| 2022/0114956 | A1* | 4/2022 | Lee | G09G 3/3225 | |
| 2023/0178034 | A1* | 6/2023 | Moon | G09G 3/3233 | 345/204 |

FOREIGN PATENT DOCUMENTS

| | | | |
|---|---|---|---|
| CN | 115862522 | A | 3/2023 |
| CN | 218631340 | U | 3/2023 |
| CN | 116863854 | A | 10/2023 |

* cited by examiner

METHOD FOR DRIVING DISPLAY PANEL, DISPLAY PANEL, AND DISPLAY APPARATUS

CROSS-REFERENCE TO RELATED DISCLOSURE

The present disclosure claims priority to Chinese Patent Application No. 202410224757.2, filed on Feb. 28, 2024, the content of which is incorporated herein by reference in its entirety.

TECHNICAL FIELD

The present disclosure relates to the field of display technologies, and in particular, to a method for driving a display panel, a display panel, and a display apparatus.

BACKGROUND

During low-frequency driving, if a new screen needs to be displayed to achieve smooth dynamic display effect, a driving frequency of the display panel is usually switched from a low frequency to a high frequency. Meanwhile, a data voltage written into the panel is adjusted to a data voltage corresponding to a to-be-switched screen, thereby completing the screen switching by using the high frequency. After the screen switching is completed, the driving frequency is restored to the original low frequency to continue low frequency display.

However, during the foregoing screen switching, the screen has relatively obvious streaking and residual shadow when the driving frequency jumps from low to high, thereby affecting the display effect.

SUMMARY

In a first aspect, an embodiment of the present disclosure provides a method for driving a display panel. In a first mode, a driving process of the display panel includes a first stage, a second stage and a third stage. In the first stage, a first screen is displayed at a first frequency; in at least a part of the second stage sequential to the first stage, the first screen is displayed at a frequency greater than the first frequency; and in the third stage, a second screen is displayed at the first frequency.

In a second aspect, an embodiment of the present disclosure provides a display panel. The display panel is driven by a method, in which, in a first mode, a driving process of the display panel comprises a first stage, a second stage and a third stage. In the first stage, a first screen is displayed at a first frequency; in at least a part of the second stage sequential to the first stage, the first screen is displayed at a frequency greater than the first frequency; and in the third stage, a second screen is displayed at the first frequency.

In a third aspect, an embodiment of the present disclosure provides a display apparatus. The display apparatus includes a display panel. The display panel is driven by a method, in which, in a first mode, a driving process of the display panel comprises a first stage, a second stage and a third stage. In the first stage, a first screen is displayed at a first frequency; in at least a part of the second stage sequential to the first stage, the first screen is displayed at a frequency greater than the first frequency; and in the third stage, a second screen is displayed at the first frequency.

BRIEF DESCRIPTION OF DRAWINGS

In order to more clearly explain the embodiments of the present disclosure or the technical solution in the related art, the drawings to be used in the description of the embodiments or the related art will be briefly described below. The drawings in the following description are some embodiments of the present disclosure. For those skilled in the art, other drawings may further be obtained based on these drawings.

DESCRIPTION OF EMBODIMENTS

In order to better understand technical solutions of the present disclosure, the embodiments of the present disclosure are described in details with reference to the drawings.

It should be clear that the described embodiments are merely part of the embodiments of the present disclosure rather than all of the embodiments. All other embodiments obtained by those skilled in the art without paying creative labor shall fall into the protection scope of the present disclosure.

The terms used in the embodiments of the present disclosure are merely for the purpose of describing specific embodiment, rather than limiting the present disclosure. The terms “a”, “an”, “the” and “said” in a singular form in the embodiments of the present disclosure and the attached claims are also intended to include plural forms thereof, unless noted otherwise.

It should be understood that the term “and/or” used in the context of the present disclosure is to describe a correlation relation of related objects, indicating that there may be three relations, e.g., A and/or B may indicate only A, both A and B, and only B. In addition, the symbol “/” in the context generally indicates that the relation between the objects in front and at the back of “/” is an “or” relationship.

As described in the background, in a low-frequency driving process, if a new screen needs to be displayed, in order to achieve a smooth dynamic display effect, a driving frequency of the display panel is usually switched from a low frequency to a high frequency. Meanwhile, a data voltage written into the panel is adjusted to a data voltage corresponding to a to-be-switched screen, so that the screen switching is completed by using a high frequency. After the screen switching is completed, the driving frequency is restored to the original low frequency to continue low frequency display.

Figure 1:
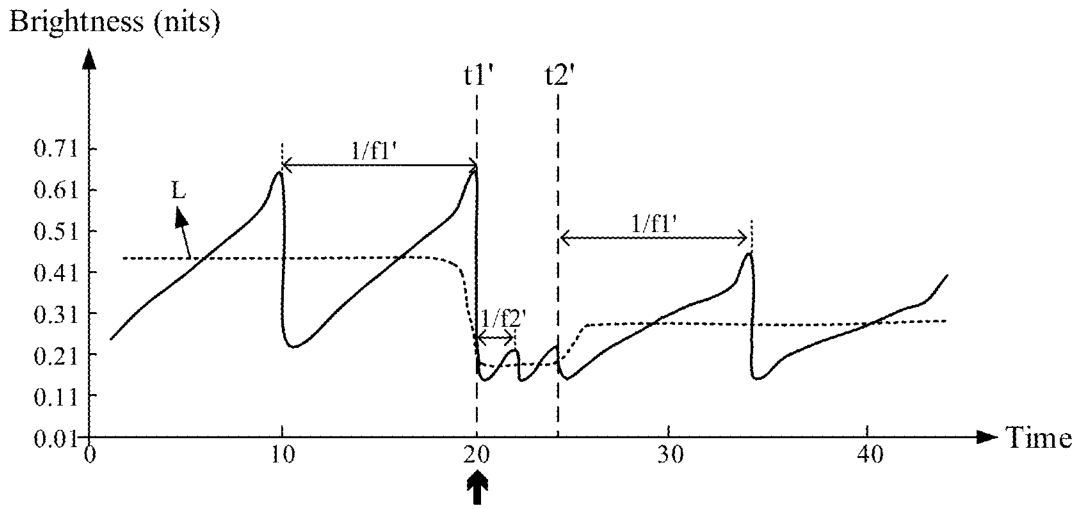
FIG. 1 (Prior Art)
FIG. 1 is a schematic diagram of an operating process of a display panel in the related art.

FIG. 1 is a schematic diagram of an operating process of a display panel in the related art. As shown in FIG. 1, the display panel displays a first screen at a frequency f1' during a low-frequency display, and the frequency f1' is a low frequency corresponding to a current low-frequency mode. When the second screen needs to be displayed, the driving frequency is switched from the frequency f1' to a higher frequency f2' at the first time point t1', and the data voltage corresponding to the second screen is written to the display panel. After the screen switching is completed, the driving frequency is restored to the original frequency f1' at the second time point t2' to continue the normal low-frequency display.

The dotted line L in FIG. 1 indicates actual brightness, and the position indicated by the bolded arrow below the horizontal axis in FIG. 1 is a time point at which the data voltage corresponding to the second screen starts to be written to the panel.

In an application scenario, the display panel displays a time screen at a low frequency, for example, the above operations are performed when the time screen of “12:00” needs to be switched to the time screen of “12:01”.

However, during the period that the screen is switched, when the driving frequency is switched from low to high, the screen may have an obvious streaking phenomenon under the influence of factors such as the hysteresis effect of a driving tube, thereby adversely affecting the display effect.

Therefore, the present disclosure provides a method for driving a display panel. During the period that the driving frequency is low, the method can effectively weaken the adverse effect of the streaking issues generated when the driving frequency is switched from low to high on the display effect.

Figure 2:
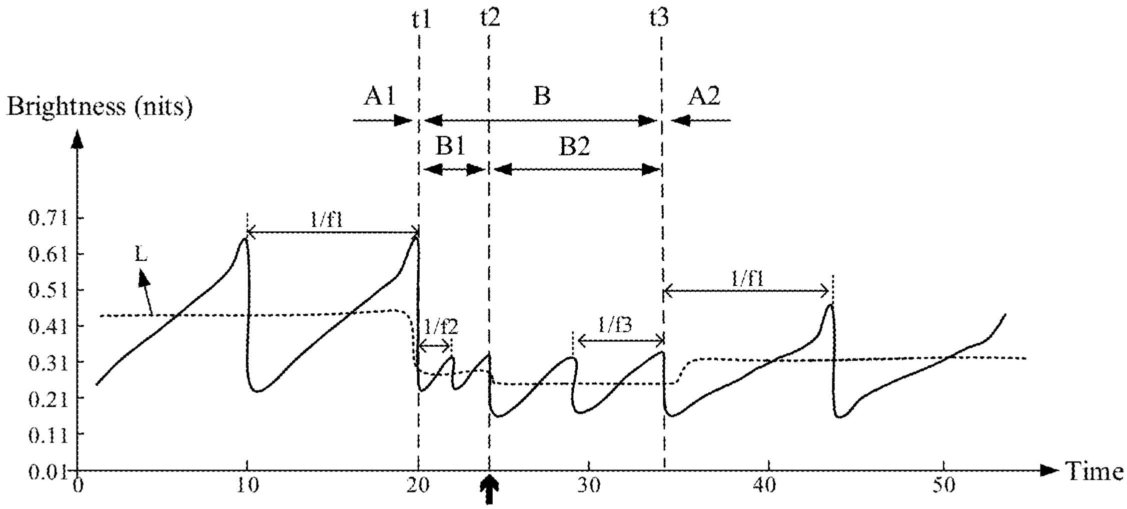
FIG. 2 is a schematic diagram of an operating process of a display panel according to an embodiment of the present disclosure.

The display panel has a first mode, and the first mode is a low-frequency display mode. FIG. 2 is a schematic diagram of an operating process of a display panel according to an embodiment of the present disclosure. As shown in FIG. 2, in a first mode, a driving process of the display panel includes a first stage A1, a second stage B and a third stage A2. In the first stage A1, the display panel displays the first screen at a first frequency f1, and the first frequency f1 may be understood as a lower frequency corresponding to the low-frequency display mode, for example, 10 Hz, 15 Hz, 20 Hz, etc. In at least part of the time period sequential to the first stage A1 in the second stage B, the display panel displays the first screen at a frequency greater than the first frequency f1. In the third stage A2, the display panel displays the second screen at the first frequency f1. That is, the first stage A1 and the second stage A2 may be understood as a normal low-frequency display period, and the second stage B in the middle may be understood as a high-frequency display period in which a short jump needs to be performed when the screen is switched.

Referring to FIG. 1 and the foregoing analysis of the related art, based on a driving mode of the related art, a high frequency switching and a screen switching is performed at a first time point t1' when switching from the first screen to the second screen. At this time, the first screen is displayed in a previous frame, and the second screen is displayed in a next frame. Therefore, when a residual shadow appears on the screen due to the high frequency switching, the residual shadow of the first screen appears on the second screen, which makes it easy for the human eyes to recognize the residual shadow.

By adopting the driving method provided by the embodiment of the present disclosure, when switching from the first screen to the second screen, the operation of first switching to the high frequency and then switching the screen is executed. Referring to FIG. 2, in the first stage A1, the first screen is normally displayed at a lower first frequency f1. When the first screen is required to switch to the second screen, only the driving frequency is switched from a low frequency to a higher frequency (the higher frequency is shown as f2 in FIG. 2), without changing the data voltage written into the panel, thereby keeping the display panel displaying the first screen. After the frequency is switched high for a period of time, the data voltage corresponding to the second screen starts to be written in to complete the switching of the second screen. In this way, when the driving frequency is switched from low to high, the last frame of the screen (that is, the screen displayed in the last frame in the first stage A1) before the switching is the same as the first screen of the screen (that is, the screen displayed in the first screen in the second stage B) after the switching, and both are the first screen. At this time, even if there is a streaking issue caused by the high frequency switching, since the streaking frame is the same as that of the currently displayed screen, the streaking issue is not easily recognizable by human eyes, thereby greatly reducing the risk of the streaking phenomenon being visible to the human eyes, and effectively mitigating the impact of the streaking phenomenon on the display effect.

In an embodiment of the present disclosure, referring again to FIG. 2, the second stage B includes a first sub-stage B1 in which the first screen is displayed at a frequency greater than the first frequency f1, and a second sub-stage B2 in which the second screen is displayed at a frequency greater than the first frequency f1, thereby achieving the switching of the screen at a higher frequency that is greater than the first frequency f1. That is, the switching of the image is completed within a transient jump of the high frequency display period, so as to achieve a smooth dynamic switching effect. Moreover, in this driving manner, only one condition of frequency needs to be switched when entering the second stage B from the first stage A1, and only one condition of screen needs to be switched when entering the third stage A2 from the second stage B, which can avoid the obvious display problem caused by switching multiple conditions simultaneously.

In the drawings of the present disclosure, the position indicated by the bolded arrow below the horizontal axis is a time point at which the data voltage corresponding to the second starts to be written to the panel.

Further, referring to FIG. 2 again, the frequency of the second sub-stage B2 is smaller than the frequency of the first sub-stage B1. In one arrangement, the display panel displays at a constant frequency in the first sub-stage and the second sub-stage, respectively. The first sub-stage B1 has a second frequency f2, and the second sub-stage B2 has a third frequency f3.

In an embodiment of the present disclosure, the first frequency f1 is 15 Hz, the second frequency f2 is 60 Hz, and the third frequency f3 is 45 Hz. Referring to FIG. 2, in the first stage A1, the display panel displays the first screen at 15 Hz. When the second screen needs to be displayed, at the first time point t1, the display panel has a driving frequency switched to 60 Hz to display the first screen at 60 Hz in the first sub-stage B1. Then, at the second time point t2, the driving frequency of the display panel is switched to 45 Hz, and the data voltage corresponding to the second screen starts to be written to the panel to display the second screen at 45 Hz in the second sub-stage B2. Then, at the third time point t3, the display panel has a driving frequency switched to 15 Hz to display the second screen at 15 Hz, so as to restore normal low-frequency driving.

At this time, the second sub-stage B2 may be considered as a frequency transition stage between the first sub-stage B1 and the third stage A2, implementing gradient transition of frequencies, and avoiding directly jumping from a very high frequency to a very low frequency when the second stage B enters the third stage A2, thereby avoiding an adverse effect that may be caused by too large frequency jump.

Further, a difference between the frequency of the second sub-stage B2 and the frequency of the first sub-stage B1 is a first difference, and a difference between the frequency of the second sub-stage B2 and the first frequency f1 is a second difference. In an embodiment of the present disclosure, the first frequency f1 is 15 Hz, the second frequency f2 is 75 Hz, and the third frequency f3 is 45 Hz.

Figure 3:
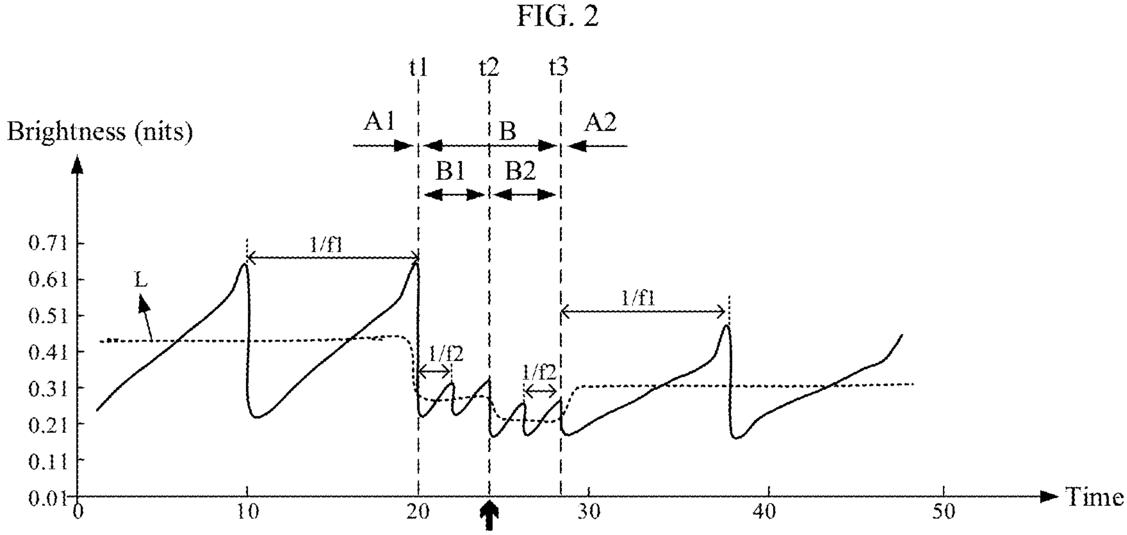
FIG. 3 is a schematic diagram of an operating process of a display panel according to another embodiment of the present disclosure.

FIG. 3 is a schematic diagram of another operating process of the display panel according to an embodiment of the present disclosure. As shown in FIG. 3, the first sub-stage B1 and the second sub-stage B2 have the same frequency. In one arrangement, the display panel displays at a constant frequency in the first sub-stage and the second sub-stage, respectively, and the first sub-stage B1 and the second sub-stage B2 have the second frequency f2, respectively.

In an embodiment of the present disclosure, the first frequency f1 is 15 Hz, and the second frequency f2 is 60 Hz. Referring to FIG. 3, in the first stage A1, the display panel displays the first screen at 15 Hz. When the second screen needs to be displayed, at the first time point t1, the driving frequency of the display panel is switched to 60 Hz, so as to display the first screen at 60 Hz in the first sub-stage B1. Then, at the second time point t2, the data voltage corresponding to the second screen starts to be written to the display panel, so as to display the second screen at 60 Hz in the second sub-stage B2. Finally, at the third time point t3, the driving frequency of the display panel is switched to 15 Hz, and the second screen is displayed at 15 Hz at low frequency, thereby resuming normal low-frequency driving.

In this manner, the entire second stage B is driven only with a constant frequency. First, the frequency setting in the second stage B is simpler. Second, when the first sub-stage B1 enters the second sub-stage B2, only the screen is switched without switching frequency, thereby avoiding an obvious display problem caused by switching multiple conditions at the same time. In addition, the overall duration of the second stage B in this manner is relatively short, which reduces power consumption.

In addition, the brightness of the same screen at different frequencies is different. Hereinafter, the second sub-stage B2 and the third stage A2 are taken as examples for illustration.

The third stage A2 has the first frequency f1, and the frequency of the second sub-stage B2 is greater than the first frequency f1, for example, the second frequency f2 or the third frequency f3. Therefore, although both same second screens are displayed, the driving frequencies are not the same.

Figure 4:
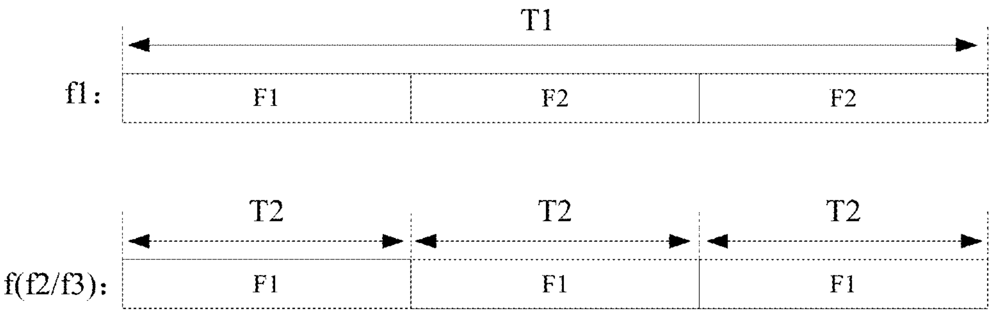
FIG. 4 is a schematic diagram of a driving period of a display panel at different frequencies according to an embodiment of the present disclosure.

In one case, the low frequency is implemented by means of frame interpolation. FIG. 4 is a schematic diagram of driving periods of a display panel at different frequencies according to an embodiment of the present disclosure. As shown in FIG. 4, the display panel has a first driving period T1 at the first frequency f1, and the first driving period T1 includes a writing frame F1 and a holding frame F2. The display panel has a second driving period T2 at a frequency f (which may be the second frequency f2 or the third frequency f3) of the second sub-stage B2, and the second driving period T2 at least includes the writing frame F1. The second driving period T2 may not include the holding frame F2, or may include the holding frame F2, but the number of the holding frames F2 included is smaller than the number of the holding frames F2 included in the first driving period T1.

Since the pixel circuit performs the data refresh operation only in the writing frame F1, and does not perform the data refresh operation in the holding frame F2. Therefore, the gate potential of the driving tube is refreshed frequently at the frequency f of the second sub-stage B2, and the gate potential of the driving tube is refreshed slowly at the first frequency f1, thereby causing the threshold voltage of the driving tube at the first frequency f1 to be significantly shifted, and making the brightness of the screen at the first frequency f1 higher. Moreover, since the pixel circuit performs the data refresh operation only in the writing frame F1, the charging degree of the driving tube is consistent in the first driving period T1 and the second driving period T2. However, since the first driving period T1 has a longer holding time, the leakage time is longer, causing the gate potential of the driving tube to be pulled down, resulting in an increase in the brightness of the screen at the first frequency f1.

The dotted line L in the drawings of the present disclosure refers to the actual brightness. Referring to FIG. 3, when entering the third stage A2 from the second sub-stage B2, an upward brightness fluctuation occurs due to the low frequency.

Figure 5:
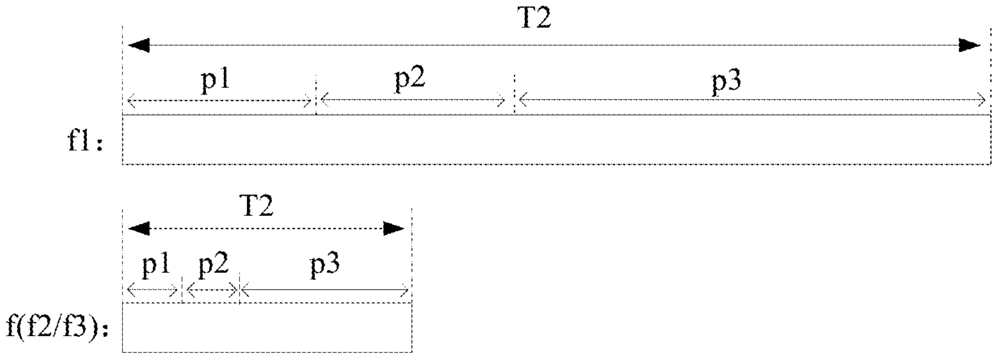
FIG. 5 is a schematic diagram of a driving period of a display panel at different frequencies according to another embodiment of the present disclosure.

Alternatively, in another case, the low frequency may further be implemented in a non-interpolated frame manner. FIG. 5 is a schematic diagram of another driving period of the display panel at different frequencies according to an embodiment of the present disclosure. As shown in FIG. 5, the display panel has the first driving period T1 at the first frequency f1, and has the second driving period T2 at the frequency f (which may be the second frequency f2 or the third frequency f3) of the second sub-stage B2. The first driving period T1 and the second driving period T2 include a reset period P1, a charging period P2 and a light-emitting period P3, respectively. A duration of the charging period P2 in the second driving period T2 is greater than a duration of the charging period P2 in the first driving period T1.

Due to the short charging time of the driving tube in the second driving period T2, the driving tube will be charged insufficiently, resulting in a lower gate potential and higher brightness the screen at the frequency f of the second sub-stage B2. Therefore, a downward brightness fluctuation will occur when entering the third stage A2 from the second sub-stage B2.

In conclusion, the brightness of the same screen at different frequencies is different, and the brightness flicker phenomenon occurs at least when entering the third stage A2 from the second sub-stage B2.

Therefore, in an embodiment of the present disclosure, different gamma curves may be set for the first frequency f1 and the frequency f of the second sub-stage B2 in a possible implementation.

In an embodiment, the display panel displays according to the mapping relationship constructed by grayscale values and data voltages. The first frequency f1 and the frequency f of the second sub-stage B2 correspond to different mapping relationships, and a same grayscale value corresponds to different data voltages in different mapping relationships.

For the same grayscale value, by enabling the first frequency f1 and the frequency f of the second sub-stage B2 to correspond to different data voltages, the brightness of the screen at the two frequencies can be adjusted as needed to reduce the brightness difference of the second screen displayed at the two frequencies, thereby effectively avoiding the brightness flicker when entering the third stage A2 from the second sub-stage B2.

Figure 6:
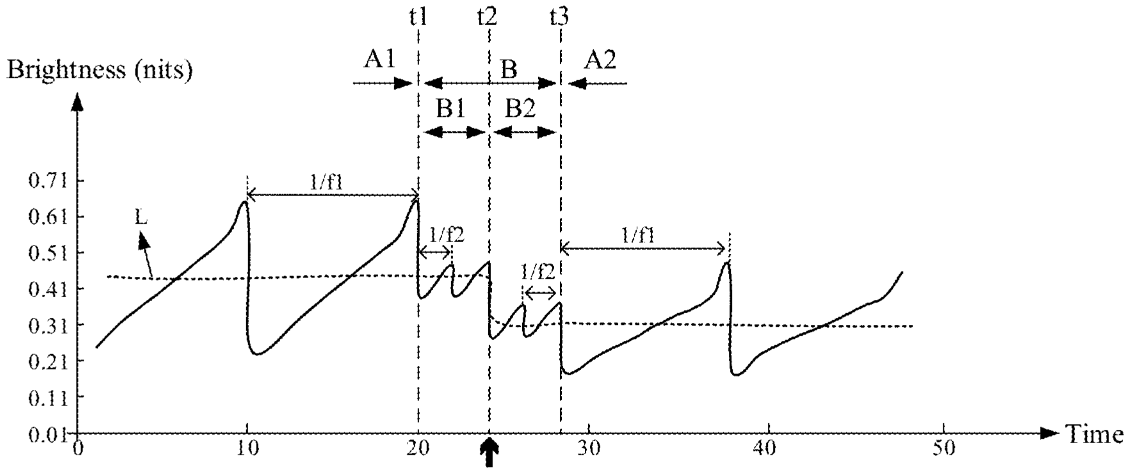
FIG. 6 is a schematic diagram of an operating process of a display panel according to another embodiment of the present disclosure.

FIG. 6 is a schematic diagram of another operating process of the display panel according to an embodiment of the present disclosure. In an embodiment of the present disclosure, as shown in FIG. 6, both the first sub-stage B1 and the second sub-stage B2 have the second frequency f2. By setting different mapping relationships for the first frequency f1 and the second frequency f2, not only the brightness of the second sub-stage B2 and the third stage A2 when displaying the second screen tends to be consistent, but also the brightness of the screen of the first stage A1 and the first sub-stage B1 when displaying the first screen tends to be consistent, thereby avoiding the flicker phenomenon when entering the first sub-stage B1 from the first stage A1 and when entering the third stage A2 from the second sub-stage B2.

Figure 7:
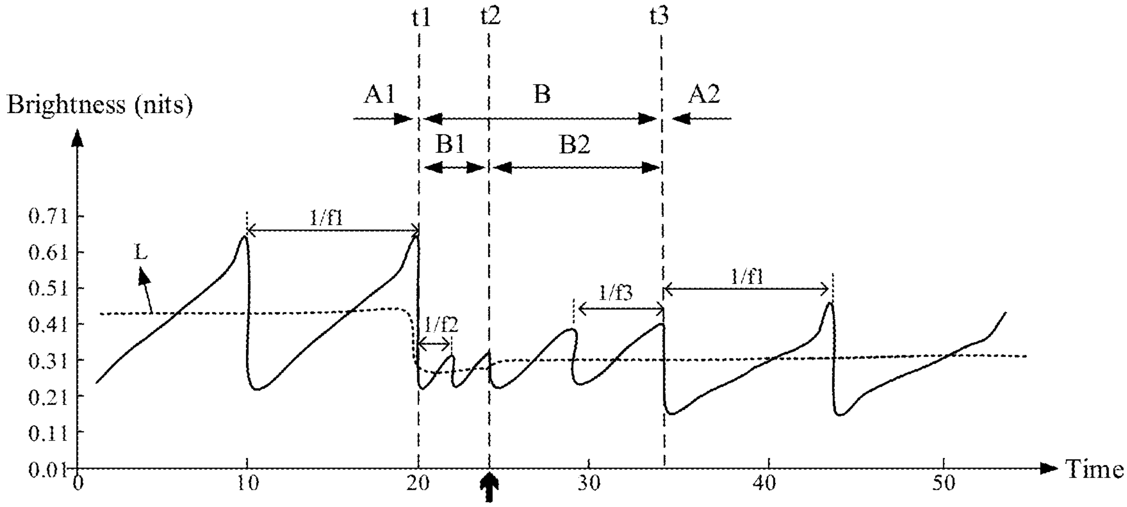
FIG. 7 is a schematic diagram of an operating process of a display panel according to another embodiment of the present disclosure.

FIG. 7 is a schematic diagram of another operating process of the display panel according to an embodiment of the present disclosure. As shown in FIG. 7, the first sub-stage B1 has the second frequency f2, and the second sub-stage B2 has the third frequency f3. By setting different mapping relationships for the first frequency f1 and the third frequency f3, the brightness of the second sub-stage B2 and the brightness of the third stage A2 when displaying the second screen tend to be consistent, thereby avoiding the flicker phenomenon when entering the third stage A2 from the second sub-stage B2.

Figure 8:
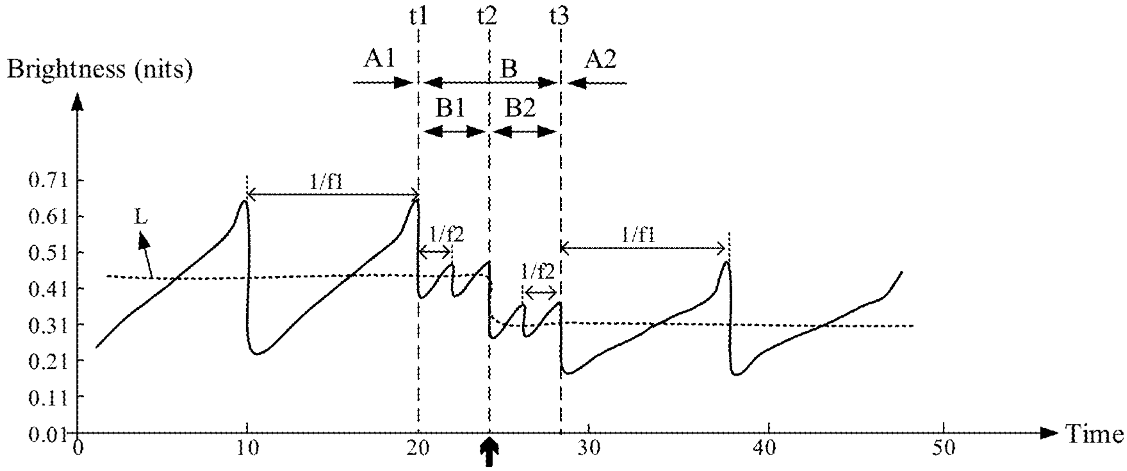
FIG. 8 is a schematic diagram of an operating process of a display panel according to another embodiment of the present disclosure.

FIG. 8 is a schematic diagram of another operating process of the display panel provided by the embodiment of the present disclosure. Further, as shown in FIG. 8, the different mapping relationships may further be set for the first frequency f1 and the second frequency f2, so that the picture brightness of the first stage A1 and the picture brightness of the first sub-stage B1 when displaying the first screen further tend to be consistent, thereby avoiding the flicker phenomenon when entering the first sub-stage B1 from the first stage A1.

More specifically, when the low frequency is implemented by using the foregoing interpolation frame manner, for the same grayscale value, the data voltage corresponding to the grayscale value may be set higher in the mapping relationship corresponding to the first frequency f1. That is, for the same grayscale value, the data voltage corresponding to the mapping relationship corresponding to the first frequency f1 is greater than the data voltage corresponding to the mapping relationship corresponding to the frequency f of the second sub-stage B2, thereby pulling down the brightness of the screen at the first frequency f1, so that the brightness of the screen tends to be consistent with the brightness of the screen at the frequency of the second sub-stage B2.

Alternatively, when the low frequency is implemented by using the foregoing non-interpolation frame manner, for the same grayscale value, the data voltage corresponding to the grayscale value may be set lower in the mapping relationship corresponding to the first frequency f1. That is, for the same grayscale value, the data voltage corresponding to the mapping relationship corresponding to the first frequency f1 is smaller than the data voltage corresponding to the mapping relationship corresponding to the frequency of the second sub-stage B2, thereby pulling up the brightness of the screen at the first frequency f1, so that the brightness of the screen tends to be consistent with the brightness of the screen at the frequency of the second sub-stage B2.

In an embodiment of the present disclosure, different duty ratios may be set for the light-emitting control signal for the first frequency f1 and the frequency f of the second sub-stage B2 in another possible implementation.

Figure 9:
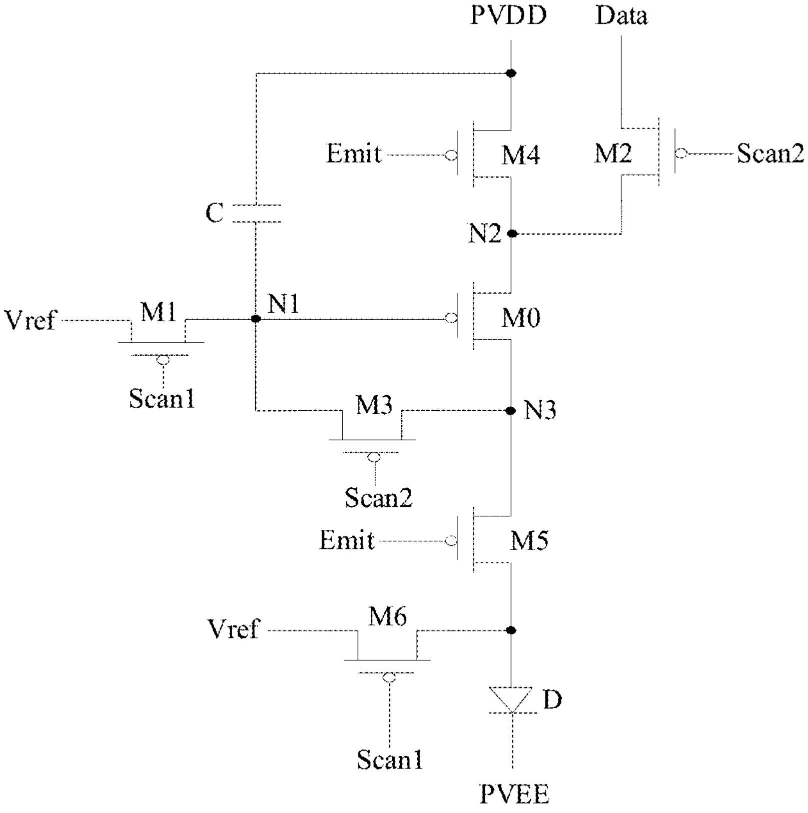
FIG. 9 is a schematic diagram of a circuit structure of a pixel circuit according to an embodiment of the present disclosure.
Figure 10:
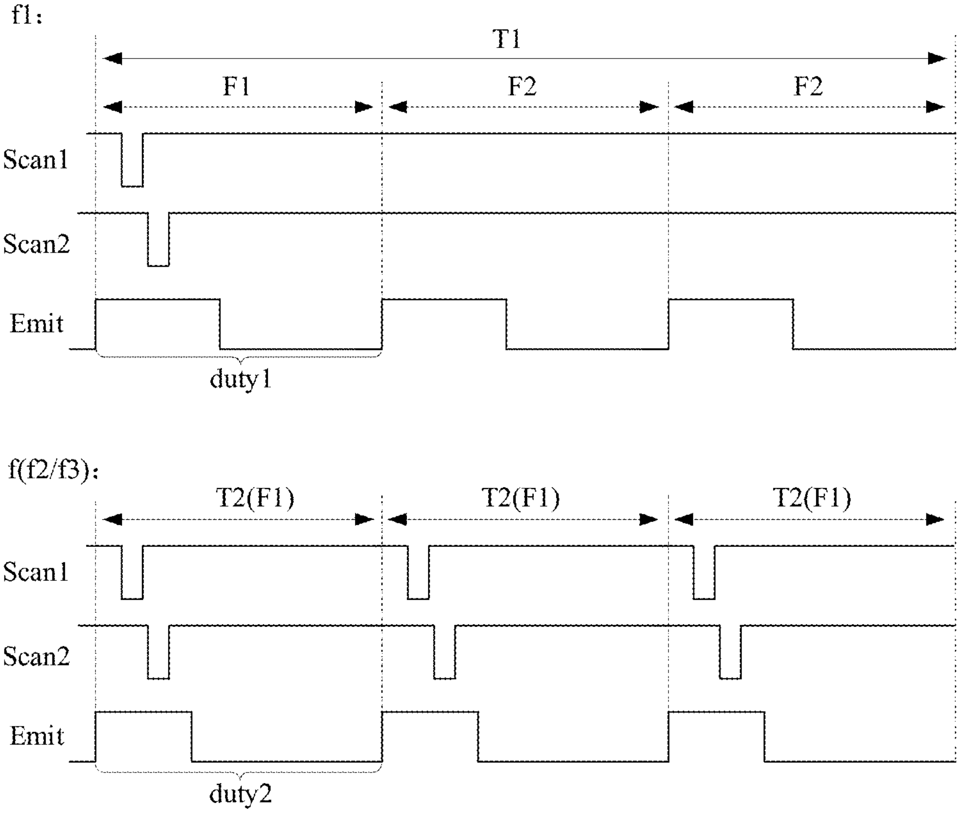
FIG. 10 is a timing sequence diagram corresponding to FIG. 4 according to an embodiment of the present disclosure.
Figure 11:
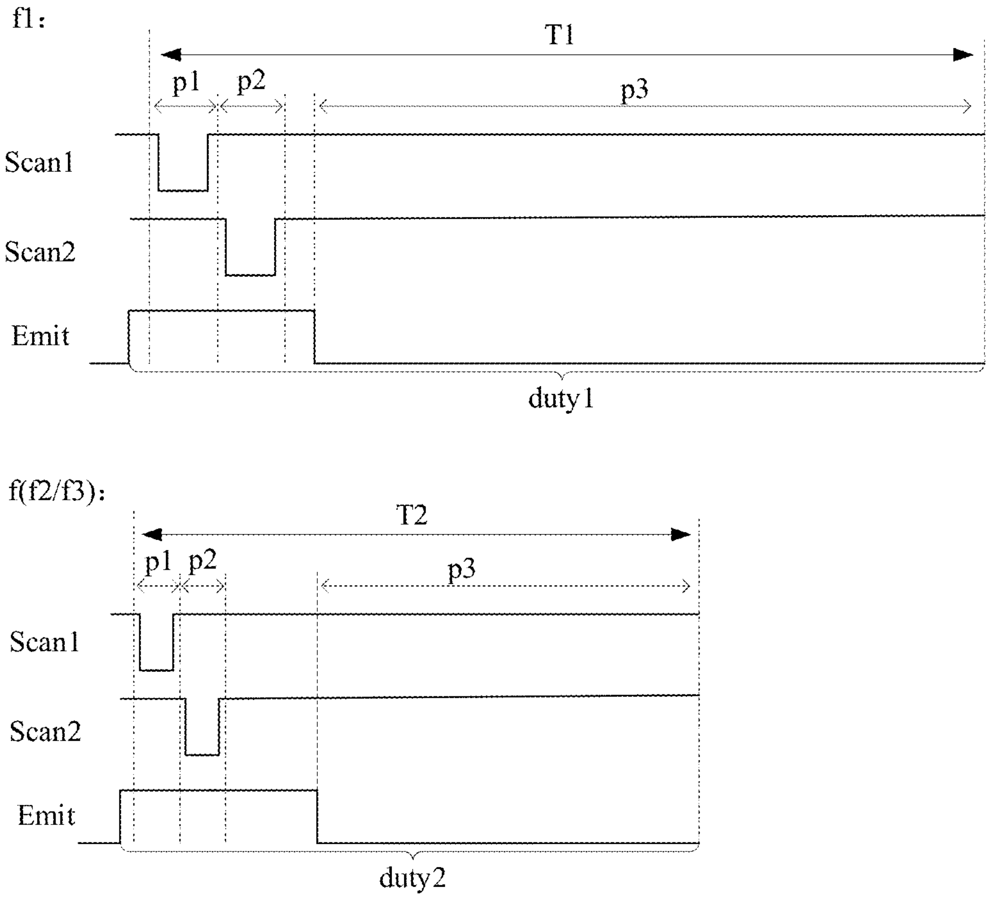
FIG. 11 is a timing sequence diagram corresponding to FIG. 5 according to an embodiment of the present disclosure.

In an embodiment, referring to FIG. 9 to FIG. 11, FIG. 9 is a schematic diagram of a circuit structure of a pixel circuit according to an embodiment of the present disclosure, FIG. 10 is a timing sequence diagram corresponding to FIG. 4, and FIG. 11 is a timing sequence diagram corresponding to FIG. 5. The duty ratios of light-emitting control signals corresponding to the first frequency f1 and the frequency f of the second sub-stage B2 are different, and the duty ratios are proportions of light-emitting active levels in the light-emitting period. In FIG. 10 and FIG. 11, the duty ratio of the light-emitting control signal corresponding to the first frequency f1 is represented by duty1, and the duty ratio of the light-emitting control signal corresponding to the frequency f in the second sub-stage B2 is represented by duty2.

Referring to FIG. 9 to FIG. 11, the pixel circuit includes a driving tube M0, a gate reset tube M1, a data writing tube M2, a threshold compensation tube M3, a first light-emitting control transistor M4, a second light-emitting control transistor M5, an anode reset tube M6, and a storage capacitor C.

The driving tube M0 has a gate electrically connected to a first node N1, a first electrode electrically connected to a second node N2, and a second electrode electrically connected to the third stage A2 N3.

The gate reset tube M1 has a gate electrically connected to a first scan line Scan1, a first electrode electrically connected to a reset signal line Vref, and a second electrode electrically connected to the first node N1. The gate reset tube M1 is configured to reset the gate of the driving tube M0 in response to a first scan active level provided by the first scan line Scan1.

The data writing tube M2 has a gate electrically connected to a second scan line Scan2, a first electrode electrically connected to a data line Data, and a second electrode electrically connected to the second node N2. The threshold compensation tube M3 has a gate electrically connected to the second scan line Scan2, a first electrode electrically connected to a third node N3, and a second electrode electrically connected to the first node N1. The data writing tube M2 and the threshold compensation tube M3 are configured to charge the driving tube M0 and perform threshold compensation in response to a second scanning active level provided by the second scanning line Scan2. The transistor shown in FIG. 9 is a P-type transistor, and thus the second scanning active level is a low level.

The first light-emitting control transistor M4 has a gate electrically connected to a light-emitting control line Emit, a first electrode electrically connected to a power line PVDD, and a second electrode electrically connected to the second node N2. The second light-emitting control transistor M5 has a gate electrically connected to the light-emitting control line Emit, a first electrode electrically connected to the third node N3, and a second electrode electrically connected to a light-emitting element D. The first light-emitting control transistor M4 and the second light-emitting control transistor M5 are configured to transmit the driving current converted by the driving tube M0 to the light-emitting element D in response to a light-emitting active level provided by the light-emitting control line Emit, to control the light-emitting element D to emit light.

The anode reset tube M6 has a gate electrically connected to the second scan line Scan2, a first electrode electrically connected to a reset signal line Vref, and a second electrode electrically connected to the light-emitting element D. The anode reset tube M6 is configured to reset the light-emitting element D in response to the second scan active level provided by the second scan line Scan2.

A storage capacitor C has a first electrode plate electrically connected to the first node N1, and a second electrode plate electrically connected to the power line PVDD.

When the transistor in the pixel circuit is a P-type transistor, each of the first scan active level, the second scan active level and the light-emitting active level is a low level. When the transistor in the pixel circuit is an N-type transistor, each of the first scan active level, the second scan active level and the light-emitting active level is a high level. The drawings of embodiments of the present disclosure are illustrated by taking the transistor in the pixel circuit as a P-type transistor as an example.

The signal provided by the light-emitting control line Emit is the light-emitting control signal. It can be understood that the duty ratio of the light-emitting control signal is used to control the light-emitting duration of the light-emitting element, thereby affecting the light-emitting brightness of the sub-pixel.

Figure 12:
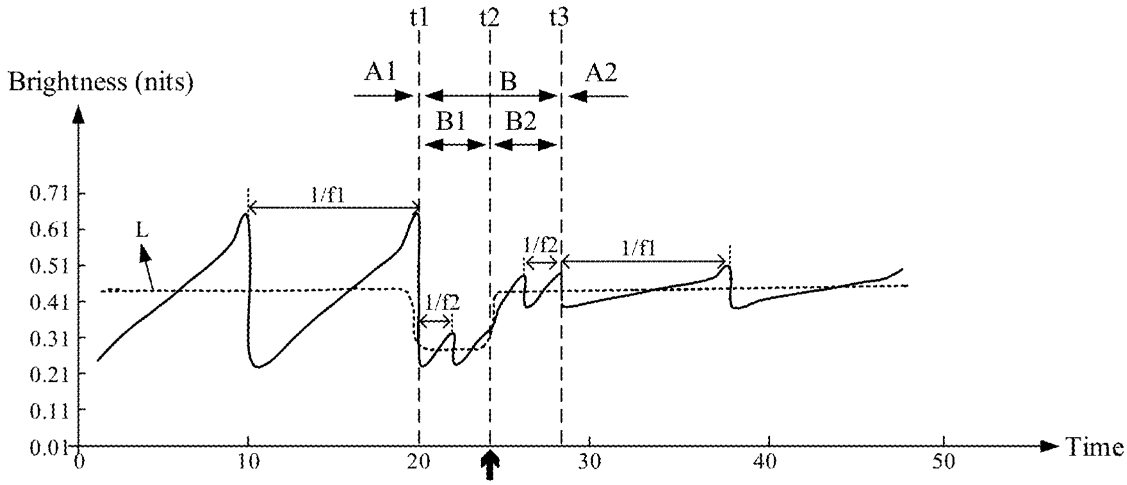
FIG. 12 is a schematic diagram of an operating process of a display panel according to another embodiment of the present disclosure.

FIG. 12 is a schematic diagram of another operating process of the display panel provided by an embodiment of the present disclosure. As shown in FIG. 12, by controlling different duty ratios of the light-emitting control signal corresponding to the first frequency f1 and the frequency of the second sub-stage B2, the brightness of the screen at the two frequencies can be adjusted as required to reduce the brightness difference of the second screen displayed at the two frequencies, thereby effectively avoiding the brightness flicker when entering the third stage A2 from the second sub-stage B2.

In addition, after adjusting the duty ratios of the light-emitting control signals at different frequencies, other conditions such as the gamma curve may not need to be adjusted. For example, at this time, the first frequency f1 and the frequency of the second sub-stage B2 may correspond to the same mapping relationship, resulting in a simpler adjustment for the panel control logic.

Further, referring to FIG. 4, FIG. 10 and FIG. 12, the display panel has the first driving period T1 at the first frequency f1, and the first driving period T1 includes the writing frame F1 and the holding frame F2. The display panel has a second driving period T2 at the frequency f of the second sub-stage B2, and the second driving period T2 includes at least the writing frame F1. The duty ratio of the light-emitting control signal in the first driving period T1 is smaller than the duty ratio of the light-emitting control signal in the second driving period T2.

With reference to the foregoing analysis, it can be seen that the low frequency in this manner is implemented by using the frame interpolation manner, and thus the brightness of the screen at the first frequency f1 is relatively high. By reducing the duty ratio of the light-emitting control signal in the first driving period T1, the light-emitting time of the light-emitting element can be shortened in the first driving period T1, and the brightness of the screen can be reduced, thereby reducing the brightness difference between the third stage A2 and the second sub-stage B2, and avoiding the flicker phenomenon when entering the third stage A2 from the second sub-stage B2.

Further, referring to FIG. 12, when the first sub-stage B1 and the second sub-stage B2 both have the second frequency f2, under the design that the duty ratio of the light-emitting control signal in the first driving period T1 is smaller than the duty ratio of the light-emitting control signal in the second driving period T2, the brightness of the first stage A1 and the brightness of the first sub-stage B1 when displaying the first screen tend to be consistent, thereby further avoiding the flicker phenomenon when entering the first sub-stage B1 from the first stage A1.

When the first sub-stage B1 has the second frequency f2 and the second sub-stage B2 has the third frequency f3, the display panel has a third driving period at the second frequency f2, and the duty ratio of the light-emitting control signal in the first driving period T1 may also be set to be smaller than the duty ratio of the light-emitting control signal in the third driving period, so that the brightness of the first stage A1 and the brightness of the first sub-stage B1 when displaying the first screen tend to be consistent, thereby avoiding the flicker phenomenon when entering the first sub-stage B1 from the first stage A1.

Alternatively, referring to FIG. 5, FIG. 11 and FIG. 12, the display panel has a first driving period T1 at the first frequency f1, and has a second driving period T2 at the frequency of the second sub-stage B2. The charging duration in the first driving period T1 is greater than the charging duration in the second driving period T2. The duty ratio of the light-emitting control signal in the second driving period T2 is smaller than the duty ratio of the light-emitting control signal in the first driving period T1.

With reference to the foregoing analysis, it can be seen that the low frequency in this manner is implemented by using a non-interpolated frame manner, and thus the brightness of the screen at the first frequency f1 is relatively low. By increasing the duty ratio of the light-emitting control signal in the first driving period T1, the light-emitting time of the light-emitting element can be shortened in the first driving period T1, and the light-emitting brightness can be reduced, thereby reducing the brightness difference between the third stage A2 and the second sub-stage B2, and avoiding the flicker phenomenon when entering the third stage A2 from the second sub-stage B2.

Further, referring to FIG. 12, when the first sub-stage B1 and the second sub-stage B2 both have the second frequency f2, under the design that the duty ratio of the light-emitting control signal in the first driving period T1 is greater than the duty ratio of the light-emitting control signal in the second driving period T2, the brightness of the first stage A1 and the brightness of the first sub-stage B1 when displaying the first screen tend to be consistent, thereby further avoiding the flicker phenomenon when entering the first sub-stage B1 from the first stage A1.

When the first sub-stage B1 has the second frequency f2 and the second sub-stage B2 has the third frequency f3, the display panel has a third driving period at the second frequency f2, and the duty ratio of the light-emitting control signal in the first driving period T1 may also be set to be greater than the duty ratio of the light-emitting control signal in the third driving period, so that the brightness of the first stage A1 and the brightness of the first sub-stage B1 when displaying the first screen tend to be consistent, thereby avoiding the flicker phenomenon when entering the first sub-stage B1 from the first stage A1.

Figure 13:
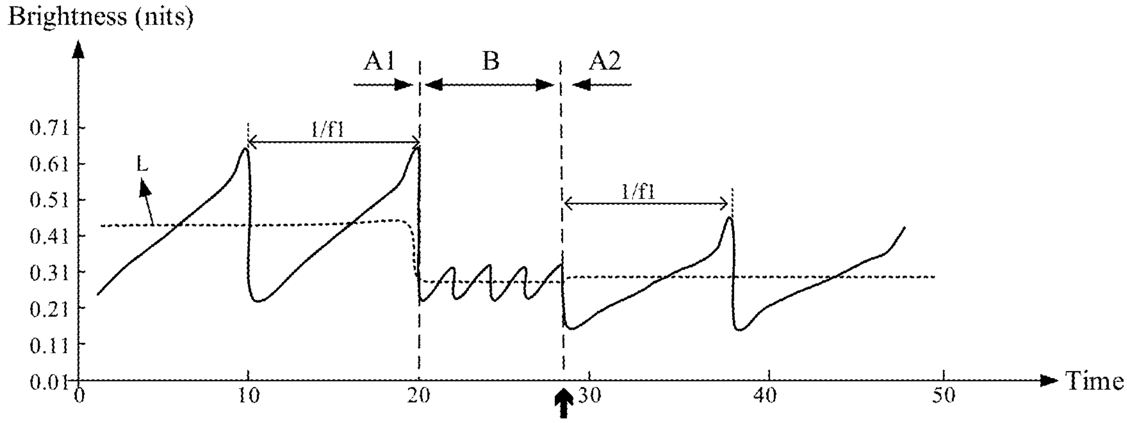
FIG. 13 is a schematic diagram of an operating process of a display panel according to another embodiment of the present disclosure.

FIG. 13 is a schematic diagram of another operating process of the display panel provided by an embodiment of the present disclosure. In an embodiment of the present disclosure, as shown in FIG. 13, the second stage B displays the first screen at a constant frequency, and the entire second stage B does not require frequency switching and screen switching, making the condition setting in the second stage B simpler.

Figure 14:
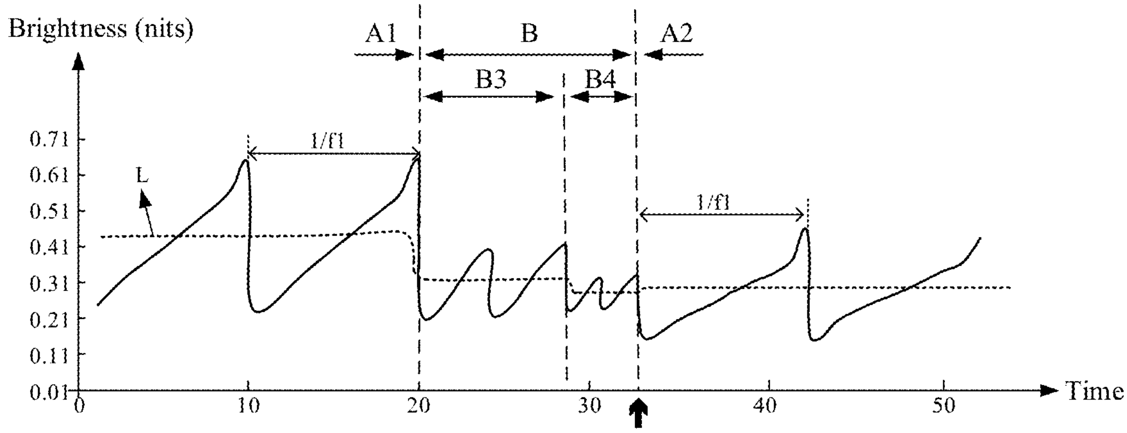
FIG. 14 is a schematic diagram of an operating process of a display panel according to another embodiment of the present disclosure.

FIG. 14 is a schematic diagram of another operating process of the display panel according to an embodiment of the present disclosure. In an embodiment of the present disclosure, as shown in FIG. 14, the second stage B includes a third sub-stage B3 and a fourth sub-stage B4, and the third sub-stage B3 is arranged between the first stage A1 and the fourth sub-stage B4. The first screen is displayed at the third sub-stage B3 and the fourth sub-stage B4, respectively, and the frequency of the third sub-stage B3 is greater than the first frequency f1 and smaller than the frequency of the fourth sub-stage B4.

In an embodiment of the present disclosure, the frequency of the first stage A1 is 15 Hz, the frequency of the third sub-stage B3 is 45 Hz, the frequency of the fourth sub-stage B4 is 60 Hz, and the frequency of the third stage A2 is 15 Hz. With reference to the foregoing analysis, it can be seen that the brightness of the screen of the same screen at different frequencies is different. In this driving manner, frequencies of the first stage A1, the third sub-stage B3, and the fourth sub-stage B4 gradually increase, and the third sub-stage B3 may be considered as a transition period between the first stage A1 and the fourth sub-stage B4, so that the first screen completes a slow transition of brightness at different frequencies.

Figure 15:
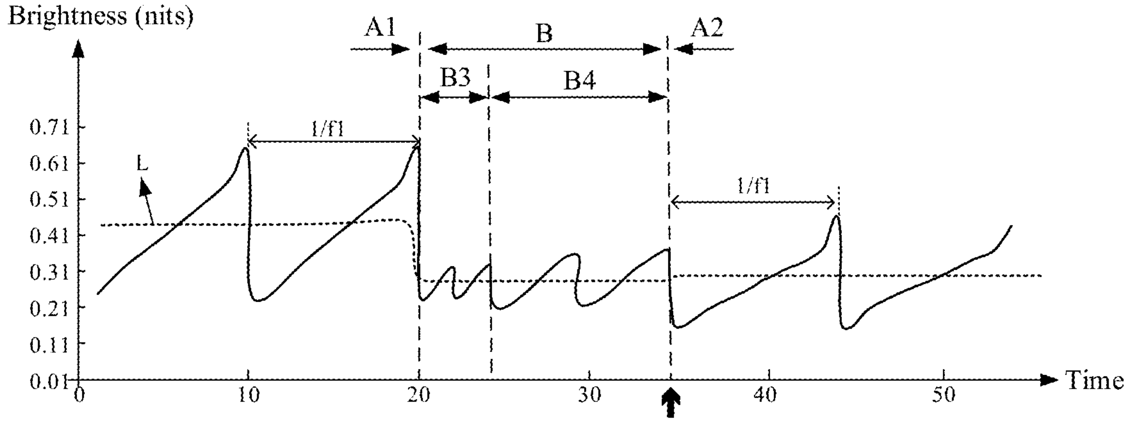
FIG. 15 is a schematic diagram of an operating process of a display panel according to another embodiment of the present disclosure.

FIG. 15 is a schematic diagram of another operating process of the display panel according to an embodiment of the present disclosure. Alternatively, as shown in FIG. 15, the second stage B includes a third sub-stage B3 and a fourth sub-stage B4, and the third sub-stage B3 is arranged between the first stage A1 and the fourth sub-stage B4. The first screen is displayed at the third sub-stage B3 and the fourth sub-stage B4, respectively, and the frequency of the fourth sub-stage B4 is greater than the first frequency f1 and smaller than the frequency of the third sub-stage B3.

In an embodiment of the present disclosure, the frequency of the first stage A1 is 15 Hz, the frequency of the third sub-stage B3 is 60 Hz, the frequency of the fourth sub-stage B4 is 45 Hz, and the frequency of the third stage A2 is 15 Hz, thereby weakening the frequency jump degree when entering the third stage A2 from the fourth sub-stage B4, and avoiding a large frequency jump while screen switching, which greatly affects display.

In an embodiment of the present disclosure, the second stage B includes x frames. To avoid an effect of reducing power consumption due to an excessively long high-frequency time inserted in low-frequency driving, x may satisfy: $1 \le x \le 15$.

Figure 16:
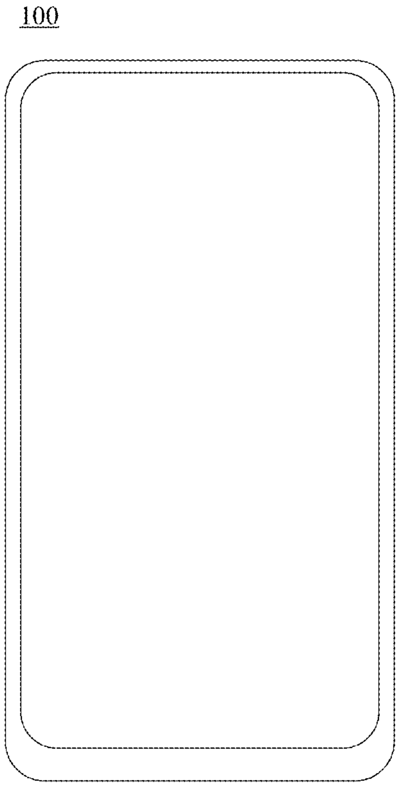
FIG. 16 is a structural schematic diagram of a display panel provided by some embodiments of the present disclosure.

Based on the same concept, the present disclosure further provides a display panel, as shown in FIG. 16. FIG. 16 is a schematic structural diagram of a display panel provided by an embodiment of the present disclosure. The display panel 100 is driven by the above driving method. Therefore, when the display panel is driven at a low frequency, the effect of the streaking issue on the display can be effectively weakened during the screen switching, so as to have better display performance.

Figure 17:
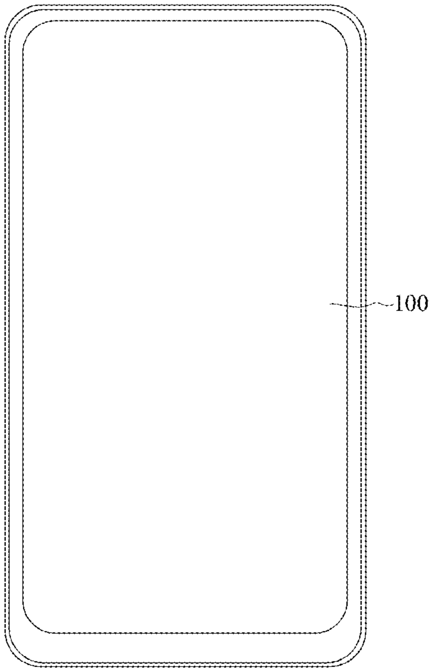
FIG. 17 is a schematic diagram of a display apparatus according to an embodiment of the present disclosure.

Based on the same concept, an embodiment of the present disclosure further provides a display apparatus, as shown in FIG. 17. FIG. 17 is a schematic structural diagram of a display apparatus provided by an embodiment of the present disclosure. The display apparatus includes the above display panel 100. The specific structure of the display panel 100 has been described in detail in the foregoing embodiments, and details are not described herein again. The display apparatus shown in FIG. 17 is merely illustrative, and the display apparatus may be any electronic device having a display function such as a mobile phone, a tablet computer, a notebook computer, an e-book, and a television.

The above are merely exemplary embodiments of the present disclosure, which, as mentioned above, are not used to limit the present disclosure. Whatever within the principles of the present disclosure, including any modification, equivalent substitution, improvement, etc., shall fall into the protection scope of the present disclosure.

Finally, it should be noted that the technical solutions of the present disclosure are illustrated by the above embodiments, but not intended to limit thereto. Although the present disclosure has been described in detail with reference to the foregoing embodiments, those skilled in the art can understand that the present disclosure is not limited to the specific embodiments described herein, and can make various modifications, readjustments, and substitutions without departing from the scope of the present disclosure.

What is claimed is:

1. A method for driving a display panel, wherein in a first mode, a driving process of the display panel comprises a first stage, a second stage and a third stage, wherein in the first stage, a first screen is displayed at a first frequency; in at least a part of the second stage sequential to the first stage, the first screen is displayed at a frequency greater than the first frequency; and in the third stage, a second screen is displayed at the first frequency, the second stage comprises a third sub-stage and a fourth sub-stage, and the third sub-stage is located between the first stage and the fourth sub-stage, and the first screen is displayed in the third sub-stage and the fourth sub-stage, and a frequency of the third sub-stage is greater than the first frequency and is smaller than a frequency of the fourth sub-stage.

2. The method according to claim 1, wherein the second stage comprises a first sub-stage and a second sub-stage;

in the first sub-stage, the first screen is displayed at a frequency greater than the first frequency; and in the second sub-stage, the second screen is displayed at a frequency greater than the first frequency.

3. The method according to claim 2, wherein a frequency of the second sub-stage is smaller than a frequency of the first sub-stage.

4. The method according to claim 3, wherein a difference between the frequency of the second sub-stage and the frequency of the first sub-stage is defined as a first difference, a difference between the frequency of the second sub-stage and the first frequency is defined as a second difference, and the first difference is equal to the second difference.

5. The method according to claim 2, wherein the first sub-stage has a same frequency as the second sub-stage.

6. The method according to claim 2, wherein the display panel displays according to a mapping relationship constructed by grayscale values and data voltages, wherein the first frequency and a frequency of the second sub-stage correspond to different mapping relationships, and a same grayscale value corresponds to different data voltages in different mapping relationships.

7. The method according to claim 2, wherein duty ratios of light-emitting control signals corresponding to the first frequency and a frequency of the second sub-stage are different, and the duty ratio denotes a proportion of a light-emitting active level in a light-emitting period.

8. The method according to claim 7, wherein the display panel has a first driving period at the first frequency, the first driving period includes a writing frame and a holding frame, the display panel has a second driving period at the frequency of the second sub-stage, and the second driving period at least comprises a writing frame; and wherein a duty ratio of the light-emitting control signal in the first driving period is smaller than a duty ratio of the light-emitting control signal in the second driving period.

9. The method according to claim 8, wherein the display panel has the first driving period at the first frequency, the display panel has the second driving period at the frequency of the second sub-stage, and a charging duration in the first driving period is greater than a charging duration in the second driving period; and wherein the duty ratio of the light-emitting control signal in the second driving period is smaller than the duty ratio of the light-emitting control signal in the first driving period.

10. The method according to claim 1, wherein the first screen is displayed in the second stage at a constant frequency.

11. The method according to claim 1, wherein the second stage comprises a third sub-stage and a fourth sub-stage, and the third sub-stage is located between the first stage and the fourth sub-stage; and the first screen is displayed in the third sub-stage and the fourth sub-stage, and a frequency of the fourth sub-stage is greater than the first frequency and is smaller than a frequency of the third sub-stage.

12. The method according to claim 1, wherein the second stage comprises x frames, where $1 \leq x \leq 15$.

13. A display panel, driven by a method, wherein in a first mode, a driving process of the display panel comprises a first stage, a second stage and a third stage, wherein in the first stage, a first screen is displayed at a first frequency; in at least a part of the second stage sequential to the first stage, the first screen is displayed at a frequency greater than the first frequency; and in the third stage, a second screen is displayed at the first frequency, the second stage comprises a third sub-stage and a fourth sub-stage, and the third sub-stage is located between the first stage and the fourth sub-stage, and the first screen is displayed in the third sub-stage and the fourth sub-stage, and a frequency of the third sub-stage is greater than the first frequency and is smaller than a frequency of the fourth sub-stage.

14. A display apparatus, comprising a display panel driven by a method, wherein in a first mode, a driving process of the display panel comprises a first stage, a second stage and a third stage, wherein in the first stage, a first screen is displayed at a first frequency; in at least a part of the second stage sequential to the first stage, the first screen is displayed at a frequency greater than the first frequency; and in the third stage, a second screen is displayed at the first frequency, wherein the second stage comprises a third sub-stage and a fourth sub-stage, and the third sub-stage is located between the first stage and the fourth sub-stage, and the first screen is displayed in the third sub-stage and the fourth sub-stage, and a frequency of the third sub-stage is greater than the first frequency and is smaller than a frequency of the fourth sub-stage.

* * * * *